G. P. WOELFEL.
PIPE WRENCH.
No. 11,459.
Reissued Dec. 18, 1894.
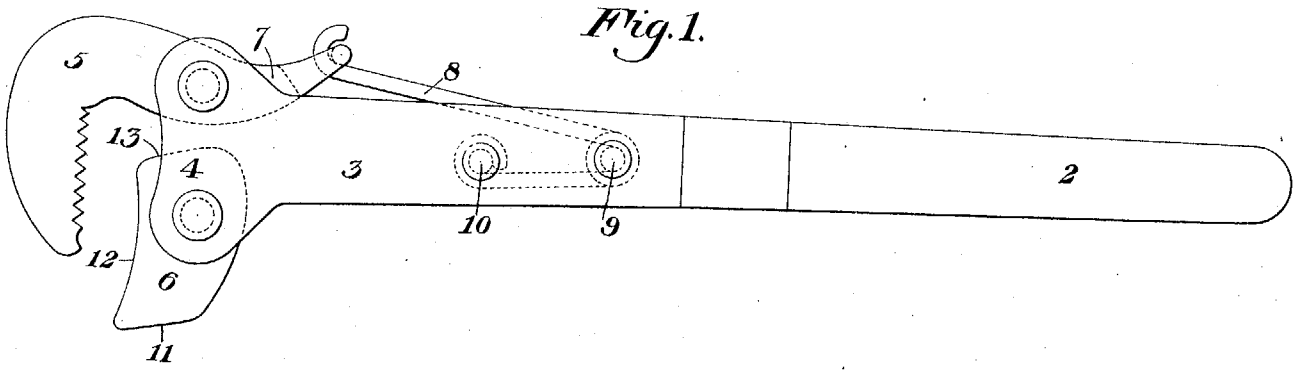
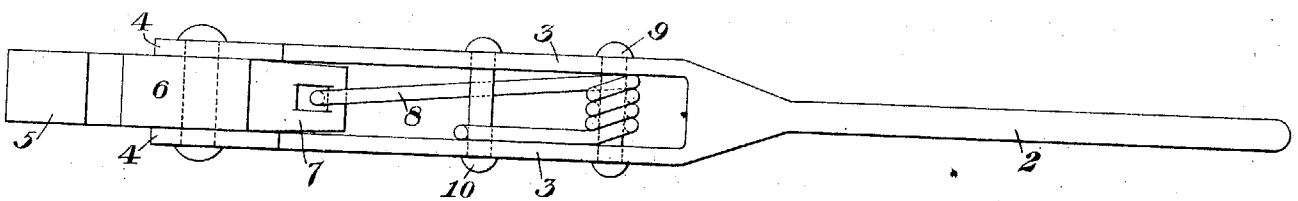
WITNESSES
W. W. Swartz
A. M. Brown
INVENTOR
George P. Woelfel
by his attorneys
R. Bakewell & Sons
THE NORRIS PETERS CO., PHOTO-LITHO., WASHINGTON, D. C.

UNITED STATES PATENT OFFICE.

GEORGE P. WOELFEL, OF SPRING GARDEN, ASSIGNOR TO JOSIAH BINDLEY, OF PITTSBURG, PENNSYLVANIA.

PIPE-WRENCH.

SPECIFICATION forming part of Reissued Letters Patent No. 11,459, dated December 18, 1894.

Original No. 497,260, dated May 9, 1893. Application for reissue filed August 10, 1894. Serial No. 519,996.

*To all whom it may concern:*

Be it known that I, GEORGE P. WOELFEL, of Spring Garden, in the county of Allegheny and State of Pennsylvania, have invented a new and useful Improvement in Pipe-Wrenches, of which the following is a full, clear, and exact description, reference being had to the accompanying drawings, forming part of this specification, in which—

Figure 1 is a side elevation of my improved pipe wrench; and Fig. 2 is a bottom plan view of the same.

My invention relates to the class of pipe wrenches having pivoted jaws, and is designed to attain a wrench which will accommodate itself to pipes of widely different sizes, which may be adjusted in place thereupon by the use of one hand applied to its handle without manually moving the jaws, and which shall not bind upon the pipe, while being of simple construction and few parts.

In the drawings, 2 represents the handle having a yoke 3 terminating in the enlarged end portions 4. Pivoted in these end portions are the two jaws 5 and 6, of which the former is a serrated hook-jaw having a rearwardly projecting tail-portion 7 movable within the yoke, while the latter is a cam-shaped jaw pivoted independently of the hook-jaw and having different faces adapted to co-operate therewith. The tail-piece 7 of the hook-jaw is slotted longitudinally and with it engages the hooked end of a spring 8, which extends thence and is coiled about a rivet 9, whence it passes to and is bent about a second rivet 10. This spring normally holds the hook-jaw in an intermediate position, and movement thereof in either direction is against the pressure of this spring. The peculiar shape of the spring and its attachment to the tail-piece allows a wide movement of its end according to the size of the pipe, while it constantly bears upon the jaw in all positions, the coils tightening as the end of the spring is moved downwardly.

The shape of the jaw 6 is of great importance, it having two bearing faces, of which the face 11 is at the greater distance from its pivotal point and is employed with small pipes, while the face 12 is nearer thereto and is used with larger pipes. A third face 13 thereof may also be employed if desired.

An important advantage of my wrench is that three bearing points for the pipe are always provided so that it cannot be crushed. Thus in the large pipes, the bearings are on the hooked jaw, the cam jaw and the ends of the yoke; while with smaller pipes the pipe bears against the serrated portion and the smooth shank portion of the hook jaw and against the face 11 of the cam-jaw. Another feature of great utility is that the cam-jaw may be changed to bring either face into operative position merely by its application to the pipe. Thus if in the position of Fig. 1 and a smaller pipe is to be operated upon, by pressing the end of the cam jaw upon the pipe it is forced inwardly, bringing the face 11 into place. To change to the former position, the tip of the hook-jaw is pressed upon the pipe and the loose cam jaw swings out. Thus in plumbing and similar work, the plumber may use one hand to hold the pipe and can manipulate the wrench entirely with one hand. The wrench can never bind upon the pipe, as the serrations engage therewith only when the wrench is turned in one direction, and when rotated in the opposite direction it frees itself at once. The purpose of the spring is to obtain the initial purchase for the serrated jaw, by its pressure upon the tail portion.

Many changes may be made in the form of the spring and its attachment to the tail-piece and in the general form and arrangement of the parts without departure from my invention, since

What I claim, and desire to secure by Letters Patent, is—

1. A pipe-wrench having a pivoted hook-jaw provided with a rearwardly extending tail-piece, a spring having an interlocking connection with the tail-piece, and a second jaw pivoted independently of the hook-jaw; substantially as described.

2. A pipe-wrench having a pivoted hook-jaw provided with a rearwardly-extending tail-piece, a spring arranged to actuate the tail-piece, and a second cam-jaw having different working faces and pivoted independently of the first; substantially as described.

3. A pipe-wrench having a pivoted hook-jaw provided with a slotted tail-piece, a coiled spring having a hook portion entering the slot, and a second pivoted cam-jaw; substantially as described.

In testimony whereof I have hereunto set my hand this 25th day of July, A. D. 1894.

GEORGE P. WOELFEL.

Witnesses:

W. B. CORWIN,

H. M. CORWIN.